(12) United States Patent
Wei et al.

(10) Patent No.: US 12,464,457 B2
(45) Date of Patent: Nov. 4, 2025

(54) DEVICE, METHOD, AND SYSTEM FOR PERIODIC WIRELESS LOCAL AREA NETWORK (WLAN) SENSING

(71) Applicant: NXP USA, Inc., Austin, TX (US)

(72) Inventors: Dong Wei, Austin, TX (US); Rui Cao, Sunnyvale, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 436 days.

(21) Appl. No.: 17/942,020

(22) Filed: Sep. 9, 2022

(65) Prior Publication Data
US 2023/0073352 A1 Mar. 9, 2023

Related U.S. Application Data

(60) Provisional application No. 63/261,044, filed on Sep. 9, 2021.

(51) Int. Cl.
*H04W 52/02* (2009.01)
*H04W 84/12* (2009.01)

(52) U.S. Cl.
CPC ........ *H04W 52/0216* (2013.01); *H04W 84/12* (2013.01)

(58) Field of Classification Search
CPC ... H04W 52/0216; H04W 84/12; Y02D 30/70
See application file for complete search history.

(56) References Cited

U.S. PATENT DOCUMENTS

| | | | | |
|---|---|---|---|---|
| 2016/0219522 A1* | 7/2016 | Asterjadhi | ........ | H04W 52/0235 |
| 2020/0359312 A1* | 11/2020 | Mirfakhraei | ...... | H04W 52/0216 |
| 2020/0374802 A1* | 11/2020 | Chu | ...................... | H04W 28/08 |
| 2021/0168722 A1* | 6/2021 | Reshef | .............. | H04W 52/0245 |
| 2023/0068824 A1* | 3/2023 | Alpert | ............... | H04W 52/0216 |

FOREIGN PATENT DOCUMENTS

WO WO-2019027511 A1 * 2/2019

OTHER PUBLICATIONS

Chen, Cheng et al. "Discussions on sensing measurement flows", IEEE 802.11-21/0990r2, Jun. 167, 2021, 15 pgs.
IEEE, "IEEE Standard for Information Technology, Telecommunications and Information Exchange between Systems Local and Metropolitan Area Networks Specific Requirement", IEEE Std 802.11ax™ (2021), 767 pgs.
Wikipedia; "WiFi Sensing"; Retrieved from internet https://en.wikipedia.org/wiki/WiFi_Sensing on Feb. 21, 2025; 6 pages.

* cited by examiner

Primary Examiner — Mohammad S Anwar (57) ABSTRACT

Embodiments of a device, a method, and a system for periodic wireless local area network (WLAN) sensing are disclosed. In an embodiment, the device includes a wireless network interface device implemented on one or more integrated circuits (ICs), where the wireless network interface device is configured to negotiate parameters for performing periodic sensing measurements, and implement the negotiated parameters when performing the periodic sensing measurements.

20 Claims, 11 Drawing Sheets

DEVICE, METHOD, AND SYSTEM FOR PERIODIC WIRELESS LOCAL AREA NETWORK (WLAN) SENSING

CROSS-REFERENCE TO RELATED APPLICATIONS

This application is entitled to the benefit of U.S. Provisional Patent Application Ser. No. 63/261,044, filed on Sep. 9, 2021, which is incorporated by reference herein.

BACKGROUND

In wireless local area network (WLAN) sensing systems, sensing devices, e.g., access points (APs) and non-AP stations (STAs), can exchange sensing information to perform periodic sensing measurements. As an example, an AP and/or a non-AP STA may operate according to certain parameters when performing the periodic sensing measurements. As such, the non-AP STA may need to remain in a wake state to exchange sensing information when performing the periodic sensing measurements. Consequently, WLAN sensing systems may experience increased power consumption, increased contention levels, and/or restricted transmission flexibility.

SUMMARY

Embodiments of a device, a method, and a system for periodic wireless local area network (WLAN) sensing are disclosed. In an embodiment, the device includes a wireless network interface device implemented on one or more integrated circuits (ICs), where the wireless network interface device is configured to negotiate parameters for performing periodic sensing measurements, and implement the negotiated parameters when performing the periodic sensing measurements.

In an embodiment, the negotiated parameters include a sleep mode schedule of the device.

In an embodiment, the negotiated parameters include a sleep mode schedule of the device, and where the sleep mode schedule is a duration of a wake interval during which the device is in a sleep mode.

In an embodiment, the negotiated parameters include a sleep mode schedule of the device, and where implementation of the sleep mode schedule includes the device transitioning from a wake state to a doze state during a wake interval.

In an embodiment, the device is in the wake state during at least one of a Target Wake Time (TWT) service period (SP) and an availability window (AW) of the wake interval, and the doze state after at least one of the TWT SP and the AW.

In an embodiment, negotiation of the parameters includes transmitting proposed parameters via a request message, and receiving a response message, where the response message indicates the negotiated parameters accepted from the proposed parameters.

In an embodiment, the negotiated parameters are scheduling parameters that determine a wake interval, at least one of a TWT SP and an AW, and a sleep mode schedule of the device.

In an embodiment, implementation of the negotiated parameters includes the device transmitting a Null Data Packet (NDP) during at least one of a TWT SP and an AW.

In an embodiment, the device transmits the NDP in response to receiving a Trigger frame (TF) during at least one of the TWT SP and the AW.

In an embodiment, implementation of the negotiated parameters includes the device transmitting an NDP during at least one of a TWT SP and an AW, and transitioning from a wake state during at least one of the TWT SP and the AW to a doze state after at least one of the TWT SP and the AW.

In an embodiment, the device negotiates parameters of a first sensing scheduling agreement and parameters of a second sensing scheduling agreement, implements the negotiated parameters of the first sensing scheduling agreement, and switches from the negotiated parameters of the first sensing scheduling agreement to the negotiated parameters of the second scheduling agreement after a predetermined period.

In an embodiment, the device negotiates parameters of a first sensing scheduling agreement and parameters of a second sensing scheduling agreement, implements the negotiated parameters of the first sensing scheduling agreement, suspends the negotiated parameters of the first sensing scheduling agreement after a predetermined period, and implements the negotiated parameters of the second sensing scheduling agreement after suspending the negotiated parameters of the first sensing scheduling agreement.

In an embodiment, the device negotiates parameters of a first sensing scheduling agreement and parameters of a second sensing scheduling agreement, and implements the negotiated parameters of the first sensing scheduling agreement and the negotiated parameters of the second sensing scheduling agreement concurrently.

In an embodiment, the device negotiates parameters of a first function scheduling agreement and parameters of a second function scheduling agreement, and implements the negotiated parameters of the first function scheduling agreement and the negotiated parameters of the second function scheduling agreement concurrently.

In an embodiment, the first function scheduling agreement is a sensing scheduling agreement, and the second function scheduling agreement is at least one of a data communication scheduling agreement, a ranging scheduling agreement, and a positioning scheduling agreement.

In an embodiment, the device is a non-access point (non-AP) station (STA), and the negotiated parameters are at least one of TWT parameters and AW parameters.

In an embodiment, the device is a non-AP STA that serves as a sensing responder and a sensing transmitter.

In an embodiment, the device is a non-AP STA that serves as a sensing responder and a sensing receiver.

A method for periodic WLAN sensing is also disclosed. In an embodiment, the method includes negotiating parameters for performing periodic sensing measurements, and implementing the negotiated parameters when performing the periodic sensing measurements.

A system for periodic WLAN sensing is also disclosed. In an embodiment, the system includes an AP configured to perform periodic sensing measurements, and a non-AP STA configured to negotiate parameters for the performed periodic sensing measurements, and implement the negotiated parameters during the performed periodic sensing measurements.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless local area network (WLAN) system (e.g., a wireless sensing system), a device, e.g., an access point (AP) (e.g., a sensing transmitter or a sensing receiver) may exchange data with at least one non-AP station (STA) (e.g., a sensing receiver or a sensing transmitter). In some embodiments, an AP may be referred to herein as a "sensing scheduler", and a non-AP STA may be referred to herein as an "STA" or a "sensing schedule requestor". The AP may be configured to operate with associated non-AP STAs according to a communication protocol. For example, the communication protocol may be an Institute of Electrical and Electronics Engineers (IEEE) 802.11bf communication protocol. Features of WLAN sensing systems operating in accordance with the IEEE 802.11bf communication protocol and/or next-generation communication protocols may be referred to herein as "non-legacy" features. In some embodiments of the WLAN sensing system described herein, different associated non-AP STAs within range of an AP operating according to the IEEE 802.11bf communication protocol may be configured to operate according to at least one other communication protocol, but may be affiliated with lower data throughput protocols. The lower data throughput communication protocols (e.g., IEEE 802.11az communication protocol, IEEE 802.11 ax communication protocol, etc.) may be collectively referred to herein as "legacy" communication protocols.

Figure 1:
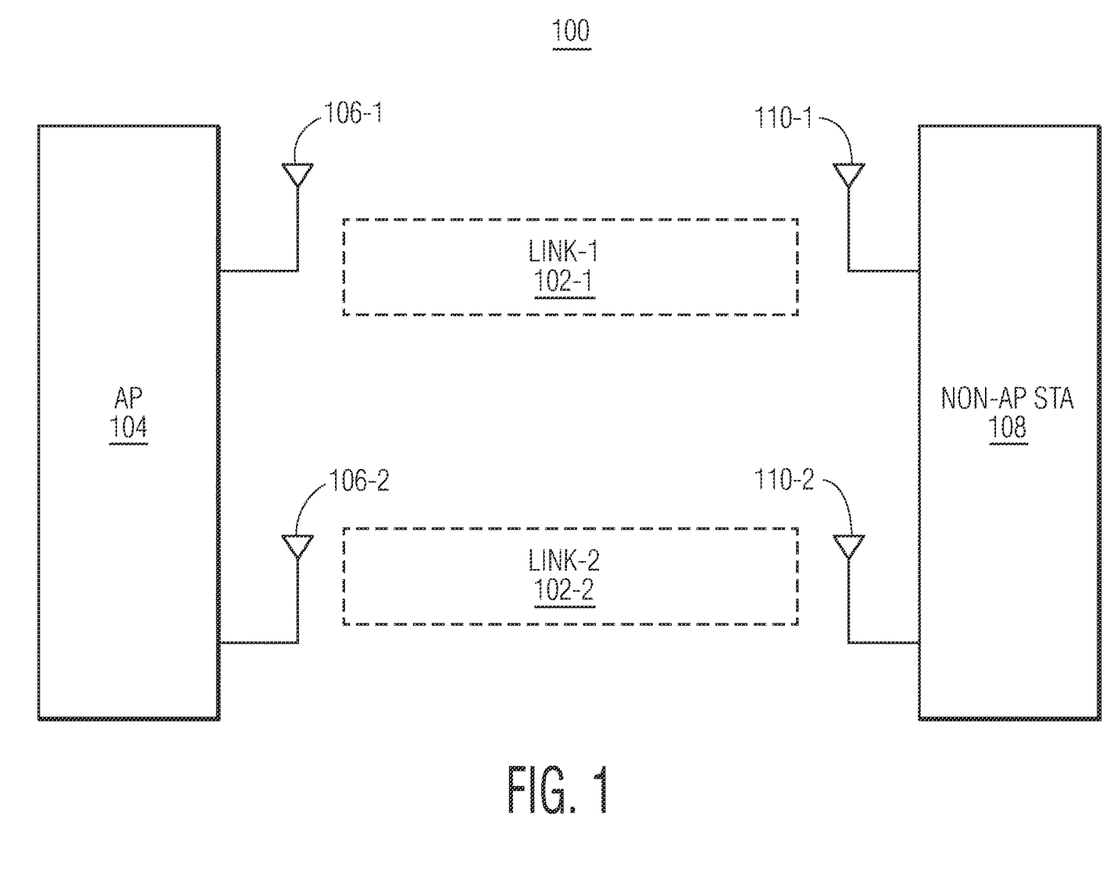
FIG. 1 depicts a wireless local area network (WLAN) sensing system.

FIG. 1 depicts a WLAN sensing system that is used for WLAN sensing. In the embodiment depicted in FIG. 1, the WLAN sensing system includes one AP, which is implemented as AP 104, and one non-AP STA, which is implemented as non-AP STA 108. The WLAN sensing system can be used in various applications, such as industrial applications, medical applications, computer applications, and/or consumer or enterprise applications. In some embodiments, the WLAN sensing system is a wireless sensing system, such as a wireless sensing system compatible with an IEEE 802.11 protocol. For example, the WLAN sensing system may be a wireless sensing system compatible with the IEEE 802.11bf protocol. Although the depicted WLAN sensing system 100 is shown in FIG. 1 with certain components and described with certain functionality herein, other embodiments of the WLAN sensing system may include fewer or more components to implement the same, less, or more functionality. For example, in some embodiments, the WLAN sensing system includes a single AP with multiple non-AP STAs. In another example, although the WLAN sensing system is shown in FIG. 1 as being connected in a certain topology, the network topology of the WLAN sensing system is not limited to the topology shown in FIG. 1.

In the embodiment depicted in FIG. 1, AP 104 includes two antennas, implemented as AP antenna-1 106-1 and AP antenna-2 106-2. In an embodiment, the AP antennas 106-1 and 106-2 may be transmit antennas, such that transmit antennas may transmit information to other devices. In another embodiment, the AP antennas 106-1 and 106-2 may be receive antennas, such that receive antennas may receive information from other devices. The AP antennas 106-1 and 106-2 may be implemented in hardware (e.g., circuits), software, firmware, or a combination thereof. The AP antennas 106-1 and 106-2 may be fully or partially implemented as part of an integrated circuit (IC) device. In some embodiments, the AP antennas 106-1 and 106-2 are implemented as part of wireless devices (e.g., wireless access points (APs) or wireless AP multi-link devices (MLDs)) compatible with at least one WLAN communications protocol (e.g., at least one IEEE 802.11 protocol). For example, the AP antennas 106-1 and 106-2 may be part of wireless APs compatible with the IEEE 802.11bf protocol. Although AP 104 is shown in FIG. 1 as including two AP antennas, other embodiments of AP 104 may include more than two AP antennas.

In some embodiments, AP 104 connects to a local area network (e.g., a local area network (LAN)) and/or to a backbone network (e.g., the Internet) through a wired connection and wirelessly connects to non-AP STAs (e.g., wireless stations (STAs)), for example, through one or more WLAN communications protocols, such as the IEEE 802.11 protocol. In some embodiments, at least one antenna (e.g., AP antenna-1 106-1 and/or AP antenna-2 106-2) is operably connected to at least one transceiver, which is operably connected to at least one controller. In some embodiments, the at least one transceiver includes a Physical Layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver.

In the embodiment depicted in FIG. 1, the non-AP STA, implemented as non-AP STA 108, includes two antennas which are implemented as STA antenna-1 110-1 and STA antenna-2 110-2. In an embodiment, the STA antennas 110-1 and 110-2 may be operate similar to the AP antennas 106-1 and 106-2. In some embodiments, non-AP STA 108 may be implemented as part of a wireless STA device (e.g., non-AP STA MLD) that wirelessly connects to wireless APs. For example, non-AP STA 108 may be implemented in a laptop, a desktop personal computer (PC), a mobile phone, or other communications device that supports at least one WLAN communications protocol. In some embodiments, non-AP STA 108 may be a communications device compatible with at least one IEEE 802.11 protocol (e.g., the IEEE 802.11bf protocol). Although non-AP STA 108 is shown in FIG. 1 as including two STA antennas, other embodiments of non-AP STA 108 may include one STA antenna or more than two STA antennas.

In the embodiment depicted in FIG. 1, non-AP STA 108 communicates with AP 104 via two communication links, e.g., link1 102-1 and link2 102-2. For example, each of the STA antennas 110-1 or 110-2 communicates with the AP antennas 106-1 or 106-2 via corresponding communication links 102-1 or 102-2. In an embodiment, a communication link (e.g., link1 102-1 or link2 102-2) may include a Basic Service Set (BSS) operating channel established by an AP (e.g., AP 104) that features multiple 20 MHz channels used to transmit packets (e.g., sounding packets, feedback packets, etc.) between a first wireless device (e.g., AP 104) and a second wireless device (e.g., non-AP STA 108). As an example, a 20 MHz channel may include a number of spatial streams ($N_{SS}$) on which packets may be transmitted and/or received. In some embodiments, a 20 MHz channel may be a punctured 20 MHz channel or an unpunctured 20 MHz channel. In addition, although AP 104 communicates (e.g., wirelessly communicates) with non-AP STA 108 via multiple links 102-1 and 102-2, in other embodiments, AP 104 may communicate (e.g., wirelessly communicate) with non-AP STA 108 via one link or more than two communication links.

In some embodiments, WLAN sensing systems (e.g., WLAN sensing system 100) perform periodic sensing measurements to detect environmental changes and exploit systematic changes using wireless signal propagation(s) between devices (e.g., an AP and/or a non-AP STA). Examples of environmental changes may include human presence detection, motion detection, activity recognition, gesture recognition, fall detection, human identification/ authentication, radar applications that sense track movement in space/time, etc. Examples of systematic changes may include dynamic changes in transmitter/receiver configurations.

When performing periodic sensing measurements, an AP and a non-AP STA may need to be in a wake state to exchange sensing information. For example, the non-AP STA may need to remain in the wake state throughout the periodic sensing measurements to receive and/or transmit packets from/to the AP. Consequently, because the non-AP STA may need to remain in the wake state, the WLAN sensing system may experience increased power consumption, increased contention levels, and/or restricted transmission flexibility. As such, WLAN sensing systems performing periodic sensing measurements may experience limited efficiency and limited overall performance.

In accordance with an embodiment of the invention, a device includes a wireless network interface device implemented on one or more ICs, wherein the wireless network interface device is configured to negotiate parameters for performing periodic sensing measurements, and implement the negotiated parameters when performing the periodic sensing measurements. By using negotiated parameters when performing periodic sensing measurements, WLAN systems can lower energy consumption, reduce contention levels, and improve transmission flexibility. As such, WLAN sensing systems may be able to adapt to environmental changes, and may experience an improvement in overall WLAN sensing quality.

As described herein, "negotiate" may imply a first device (e.g., a non-AP STA) proposing a parameter or set of parameters to a second device (e.g., an AP), the second device rejecting and/or accepting some or all of the proposed parameter(s), and the second device indicating to the first device, the accepted parameter(s) from the proposed parameter(s). In some embodiments, the first device and the second device may perform several "negotiations" to establish the accepted parameter(s).

As described herein, "implement" may imply a first device and/or a second device operating according to negotiated parameters (e.g., accepted parameters) when performing a wireless operation (e.g., periodic sensing measurements). In some embodiments, the first device and the second device may implement some (or all) of the negotiated parameters by performing the periodic sensing measurements while using the negotiated parameters.

As described herein, a WLAN sensing system may be defined as a wireless system capable of performing WLAN sensing, and that may include two or more devices, e.g., an AP and a non-AP STA. The AP may be defined as the device that initiates WLAN sensing and/or that wants to possess sensing measurement results. As an example, an "AP" is a sensing initiator and may be a sensing transmitter or a sensing receiver that is implemented as a device (e.g., an STA, an AP, a third party device, or the like). The non-AP STA may be defined as the device that responds to the AP during WLAN sensing. As an example, a "non-AP STA" is a sensing responder and may be a sensing transmitter or a sensing receiver that is implemented as a device (e.g., an STA, an AP, a third party device, or the like). Other devices may include WLAN transmitters and WLAN responders.

Examples of a WLAN sensing system performing sensing are described in further detail with reference to FIGS. 2, 3A-3B, and 4A-4B.

Figure 2:
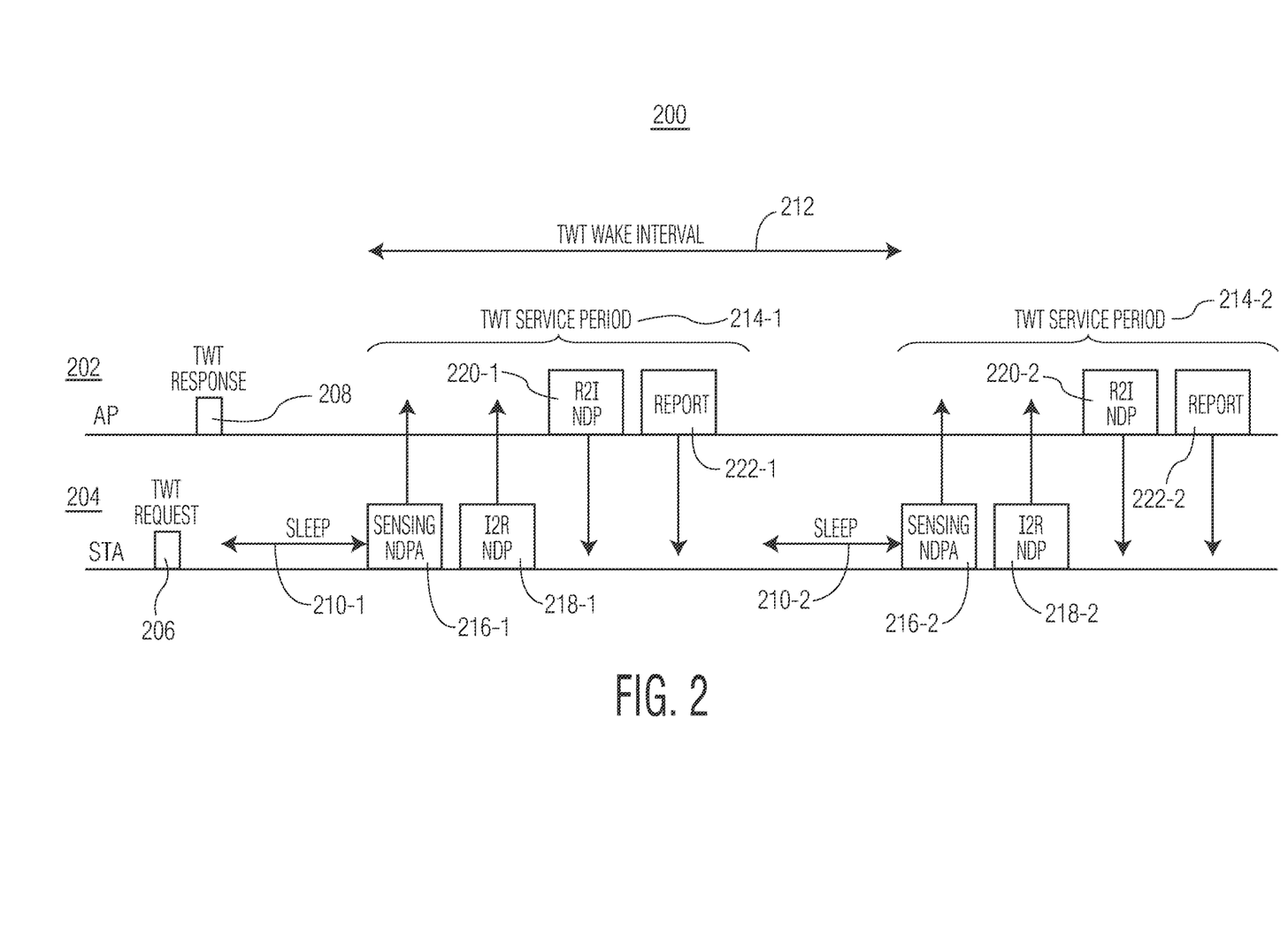
FIG. 2 illustrates an example of a WLAN sensing system performing non-Trigger-based (non-TB) sensing.

FIG. 2 illustrates an example of a WLAN sensing system 200 performing non-Trigger-based (non-TB) sensing. In the embodiment of FIG. 2, the WLAN sensing system 200 includes an AP 202 and a non-AP STA 204. AP 202 is, e.g., a Target Wake Time (TWT)-scheduling AP that may serve as a sensing responder and a sensing receiver. STA 204 is, e.g., a TWT-requesting non-AP STA that may serve as a sensing initiator and a sensing transmitter. In an embodiment, AP 202 and STA 204 communicate via a wireless communication link (not shown).

To initiate a negotiation, STA 204 transmits a request message, implemented as TWT request 206, to AP 202. In an embodiment, the request message indicates proposed parameters for performing periodic sensing measurements. For example, the TWT request 206 indicates proposed scheduling parameters (e.g., a TWT wake interval, a TWT service period (SP) or an availability window (AW), a sleep mode schedule, etc.) for STA 204. After receiving the TWT request 206, AP 202 transmits a response message, implemented as TWT response 208, to STA 204. In an embodiment, the response message indicates negotiated parameters accepted from the proposed parameters. For example, the TWT response 208 indicates negotiated TWT parameters for AP 202 that were accepted from the proposed scheduling parameters of STA 204. During the negotiation, STA 204 is in a wake state (not shown). Although not shown, in some embodiments, the negotiation may involve multiple exchanges of request messages and response messages. In such an embodiment, AP 202 may reject some (or all) of the proposed parameters, and STA 204 may respond with different (or new) proposed parameters, such that the exchange may repeat until an agreement is reached.

In an embodiment, the negotiated parameters that are accepted from the proposed parameters are included as part of one or more sensing scheduling agreements or function scheduling agreements. As described herein, a "sensing scheduling agreement" may be referred to as a set of negotiated parameters that determine how one or more devices (e.g., AP 202 and/or STA 204) intend to operate during WLAN sensing. As described herein, a "function scheduling agreement" may be referred to as a set of negotiated parameters that determine how one or more devices intend to operate during data communications, ranging, positioning, etc. Examples of function scheduling agreements include a data communication scheduling agreement, a ranging scheduling agreement, a positioning scheduling agreement, etc. In some embodiments, a WLAN sensing system may have up to eight agreements (e.g., sensing scheduling agreements and/or function scheduling agreements).

After receiving the TWT response 208, STA 204 goes into a first sleep period 210-1 of a sleep mode schedule. As described herein, a "sleep period" may refer to a duration where a device (e.g., STA 204) is in a sleep mode (e.g., a doze state). The first sleep period 210-1 ends when a wake interval, implemented as TWT wake interval 212, begins. At the beginning of the TWT wake interval 212, a first TWT SP 214-1 begins where STA 204 transitions to a wake state (not shown), obtains a transmission opportunity, and transmits a first sensing Null Data Packet (NDP) Announcement (NDPA) frame 216-1 and a first Initiator-to-Responder (I2R) NDP 218-1 to AP 202. After receiving the first sensing NDPA frame 216-1 and I2R NDP 218-1, AP 202 transmits a first Responder-to-Initiator (R2I) NDP 220-1 and a first report frame 222-1 to STA 204. The first TWT SP 214-1 ends after STA 204 receives the first R2I NDP 220-1 and the first report frame 222-1.

After the first TWT SP 214-1, STA 204 transitions from the wake state into a second sleep period 210-2 of the sleep mode schedule. In an embodiment, the second sleep period 210-2 occurs during the TWT wake interval 212 and ends at the approximately the same time as the TWT wake interval. After the second sleep period 210-2 and the TWT wake interval 212 end, STA 204 returns to a wake state, obtains a transmission opportunity, and transmits a second NDPA frame 216-2 and a second I2R NDP 218-2 to AP 202 during a second TWT SP 214-2. After receiving the second NDPA frame 216-2 and the second I2R NDP 218-2, AP 202 transmits a second R2I NDP 220-2 and a second report frame 222-2 to STA 204.

In an embodiment, the TWT wake interval 212, the first TWT SP 214-1, the second TWT SP 214-2, and the sleep mode schedule of STA 204 are part of the implemented negotiated parameters (e.g., TWT parameters) determined by the negotiation between AP 202 and STA 204. The exchange of the TWT request 206 and the TWT response 208 determined the negotiated parameters for performing periodic sensing measurements of the non-TB sensing. The periodic sensing measurements are performed when STA 204 transmits the first NDPA frame 216-1 and the second NDPA frame 216-2 to AP 202, such that AP 202 performs the periodic sensing measurements and provides measurement feedback via the first report frame 222-1 and the second report frame 222-2.

Although not shown, AP 202 and STA 204 may repeat the frame exchanges during the non-TB sensing for each subsequent TWT wake interval and/or TWT SP. For example, the TWT wake interval 212, the first TWT SP 214-1, exchange of the first NDPA frame 216-1, the first I2R NDP 218-1, the first R2I NDP 220-1, and the first report frame 222-1, and the sleep periods (e.g., the second sleep period 210-2) may be repeated when performing periodic sensing measurements.

Figure 3A:
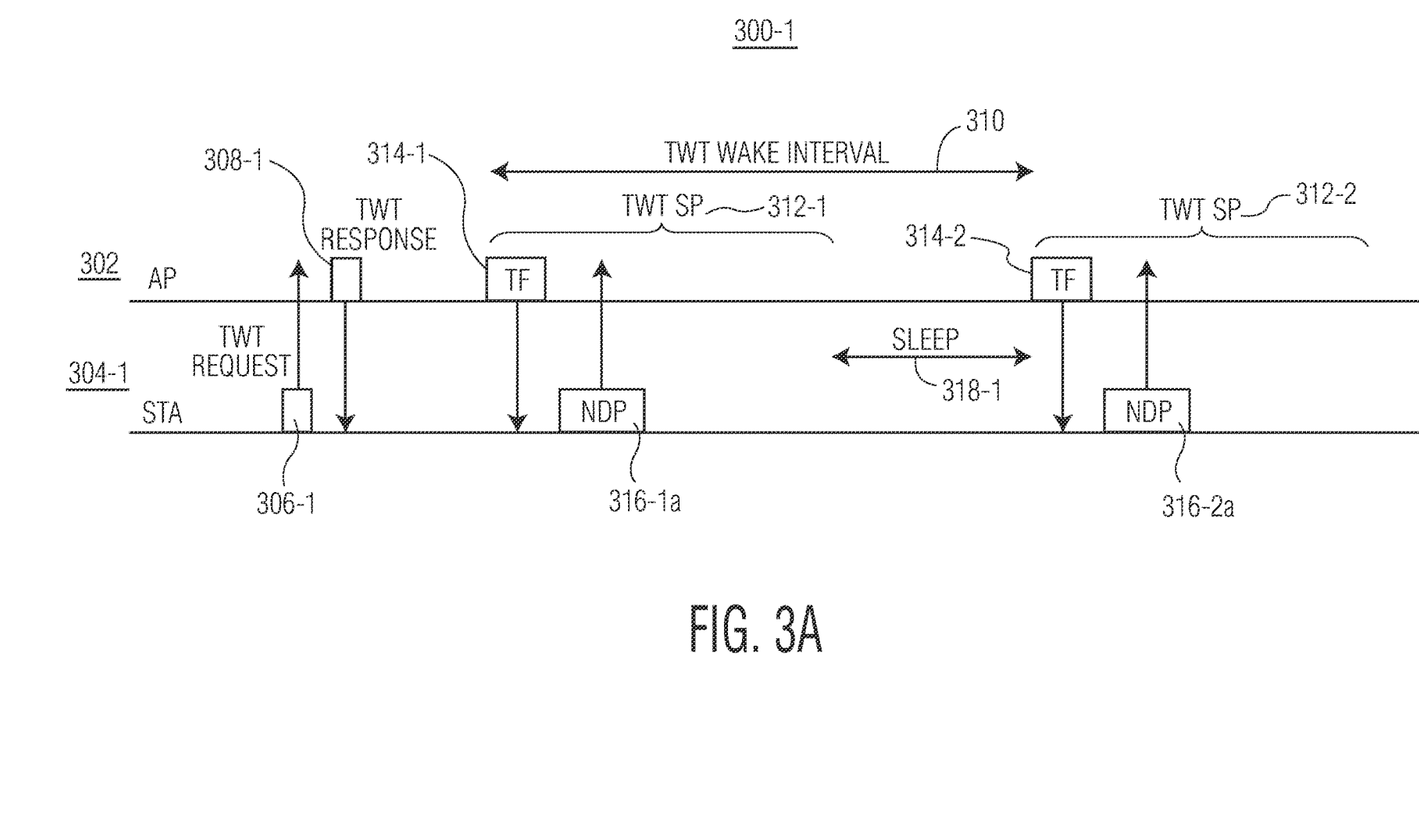
FIG. 3A illustrates an example of a WLAN sensing system performing Trigger-based (TB) sensing.

FIG. 3A illustrates an example of a WLAN sensing system 300-1 performing Trigger-based (TB) sensing. The embodiment of FIG. 3A includes an AP 302, an STA 304-1, a TWT request 306-1, a TWT response 308-1, a TWT wake interval 310, a first TWT SP 312-1, a second TWT SP 312-2, a first NDP 316-1a, a second NDP 316-2a, and a first sleep period 318-1 as described with reference to FIG. 2.

In contrast to FIG. 2, the TB sensing of the WLAN sensing system 300-1 shown in FIG. 3A includes STA 304 transmitting the first NDP 316-1a and the second NDP 316-2a in response to a first Trigger frame (TF) 314-1 and a second TF 314-2, respectively, which are transmitted by AP 302. The first TF 314-1 and the second TF 314-2 are used in the TB sensing to solicit NDPs (e.g., the first NDP 316-1a and the second NDP 316-2a) when performing periodic sensing measurements. In some embodiments, the TFs 314-1 and 314-2 allow AP 302 to provide further instructions to STA 304 beyond the negotiated parameters established by the exchange of the TWT request 306-1 and the TWT response 308-1.

Figure 3B:
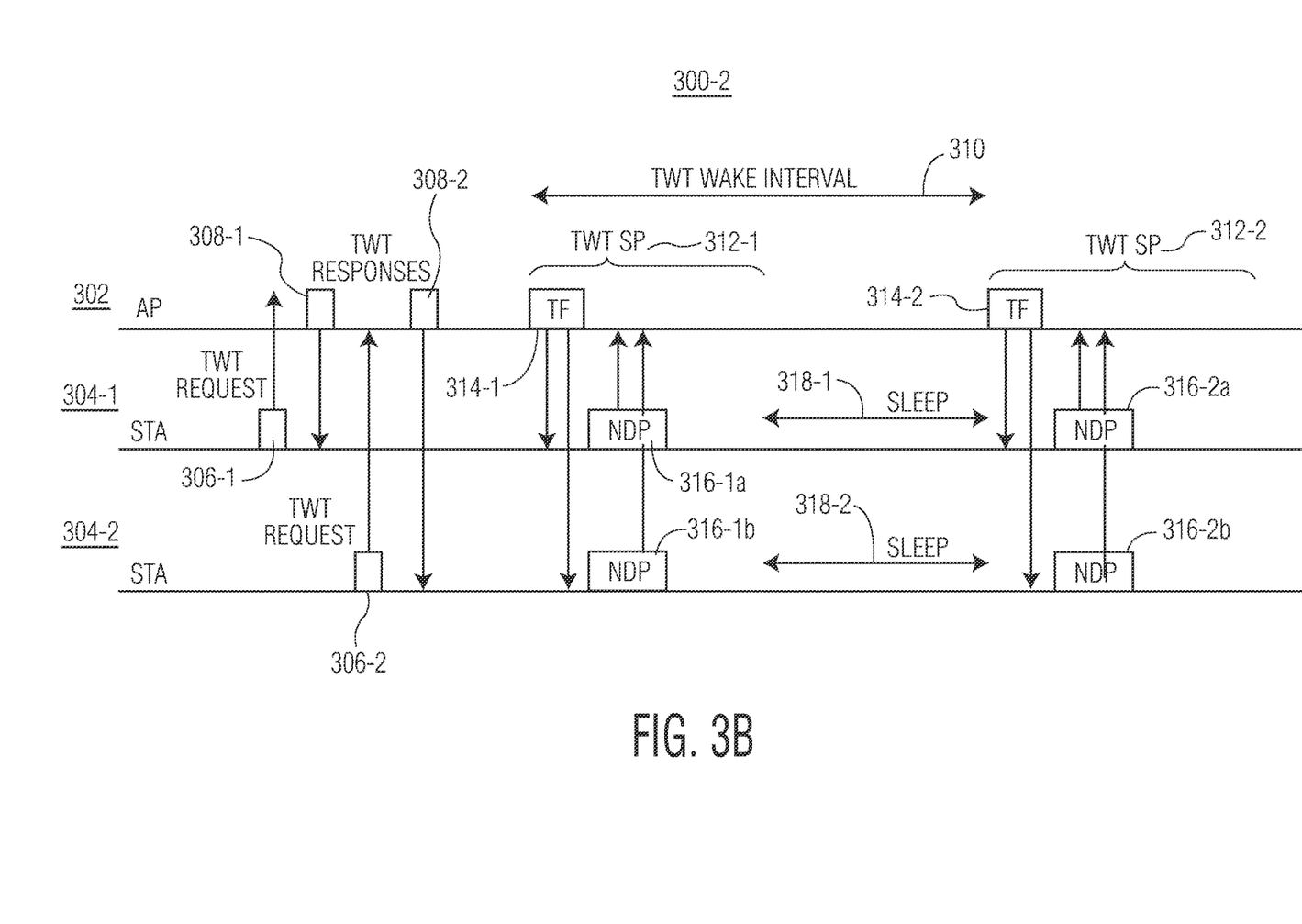
FIG. 3B illustrates another example of a WLAN sensing system performing TB sensing.

FIG. 3B illustrates another example of a WLAN sensing system 300-2 performing TB sensing. The embodiment of FIG. 3B includes AP 302, STA 304-1, the TWT request 306-1, the TWT response 308-1, the TWT wake interval 310, the first TWT SP 312-1, the second TWT SP 312-2, the first TF 314-1, the second TF 314-2, the first NDP 316-1*a*, the second NDP 316-2*a*, and the first sleep period 318-1 as described with reference to FIG. 3A.

In contrast to FIG. 3A, the TB sensing of the WLAN sensing system 300-2 shown in FIG. 3B includes a second STA 304-2 transmitting a second TWT request 306-2 to AP 302, and receiving a second TWT response 308-2 from AP 302. In an embodiment, exchange of the second TWT request 306-2 and the second TWT response 308-2 is part of a second negotiation between the second STA 304-2 and AP 302. The second negotiation may be used to share the agreement established by the negotiation between AP 302 and STA 304-1, or to determine a second agreement (e.g., a second sensing scheduling agreement and/or a second function scheduling agreement) to be implemented when performing the periodic sensing measurements. In addition, the second STA 304-2 receives the first TF 314-1 and the second TF 314-2 from AP 302 and in response, the second STA 304-2 transmits another first NDP 316-1*b* and another second NDP 316-2*b*, respectively, to AP 302. During the TWT wake interval 310, the second STA 304-2 transitions to another first sleep period 318-2 after the first TWT SP 312-1.

Figure 4A:
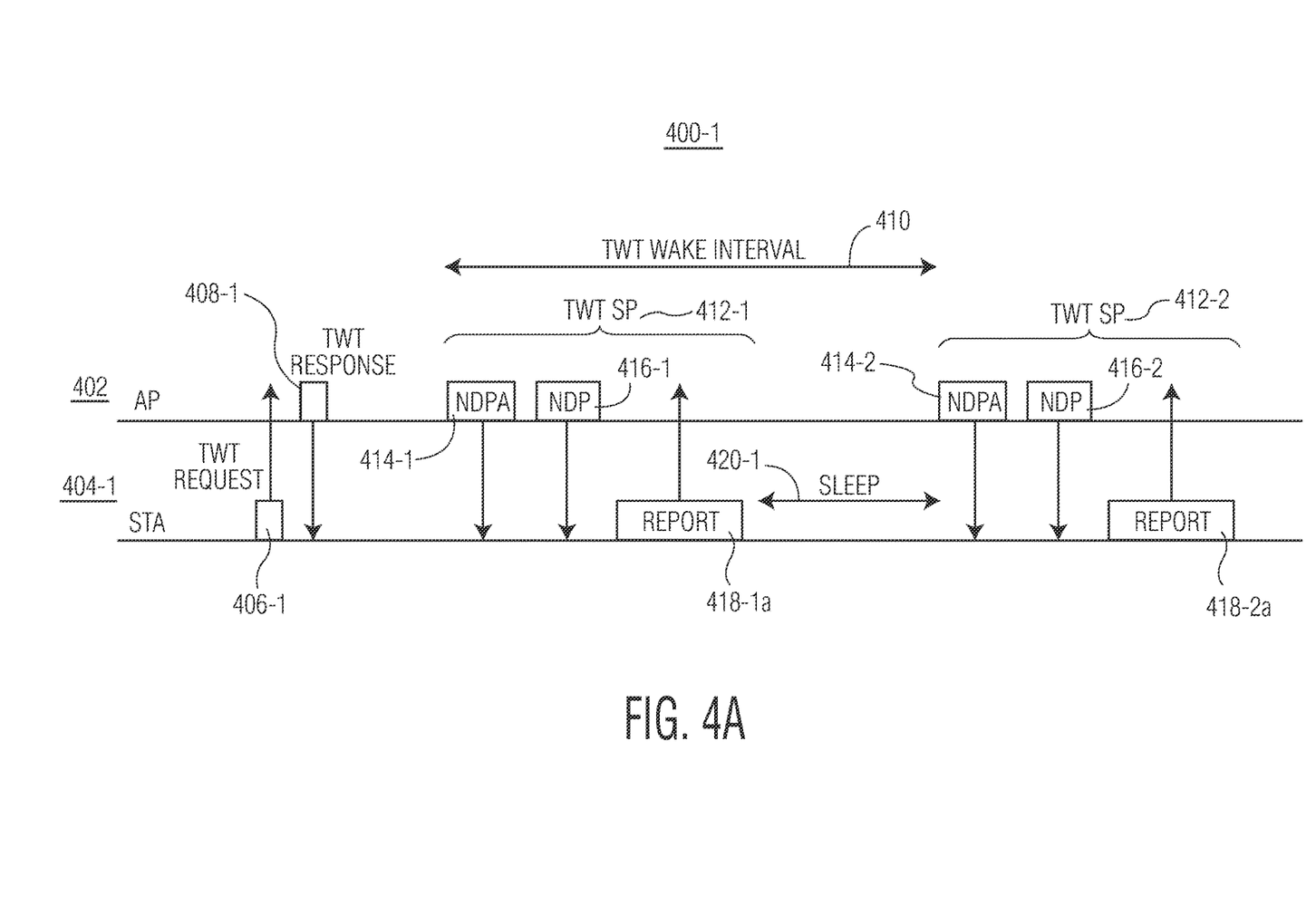
FIG. 4A illustrates an example of a WLAN sensing system performing sensing using a Null Data Packet (NDP) Announcement (NDPA) frame.

FIG. 4A illustrates an example of a WLAN sensing system 400-1 performing sensing using an NDPA frame. The embodiment of FIG. 4A includes an AP 402, an STA 404-1, a TWT request 406-1, a TWT response 408-1, a TWT wake interval 410, a first TWT SP 412-1, a second TWT SP 412-2, a first NDP 416-1, a second NDP 416-2, and a sleep period 420-1 as described with reference to FIG. 2.

In contrast to FIG. 2, AP 402 is, e.g., a TWT-scheduling AP that may serve as a sensing initiator and a sensing transmitter, and STA 404-1 is, e.g., a TWT-requesting non-AP STA that may serve as a sensing responder and a sensing receiver. Additionally, the sensing of the WLAN sensing system 400-1 shown in FIG. 4A includes AP 402 obtaining a first transmission opportunity and transmitting a first NDPA frame 414-1 to STA 404-1 during the first TWT SP 412-1, and obtaining a second transmission opportunity and transmitting a second NDPA frame 414-2 to STA 404-1 during the second TWT SP 412-2. In an embodiment, AP 402 transmits the first NDP 416-1 and the second NDP 416-2 after transmitting the first NDPA frame 414-1 and the second NDPA frame 414-2, respectively.

After receiving the NDPA frames 414-1 and 414-2 and the NDPs 416-1 and 416-2, STA 404-1 performs the periodic sensing measurements and provides measurement feedback to AP 402. As an example, the measurement feedback of the periodic sensing measurements is included in a report frame (e.g., a measurement feedback frame). STA 404-1 transmits a first report frame 418-1*a* and a second report frame 418-2*a* to AP 402 after receiving the first NDPA frame 416-1 and the second NDPA frame 416-2, respectively.

Figure 4B:
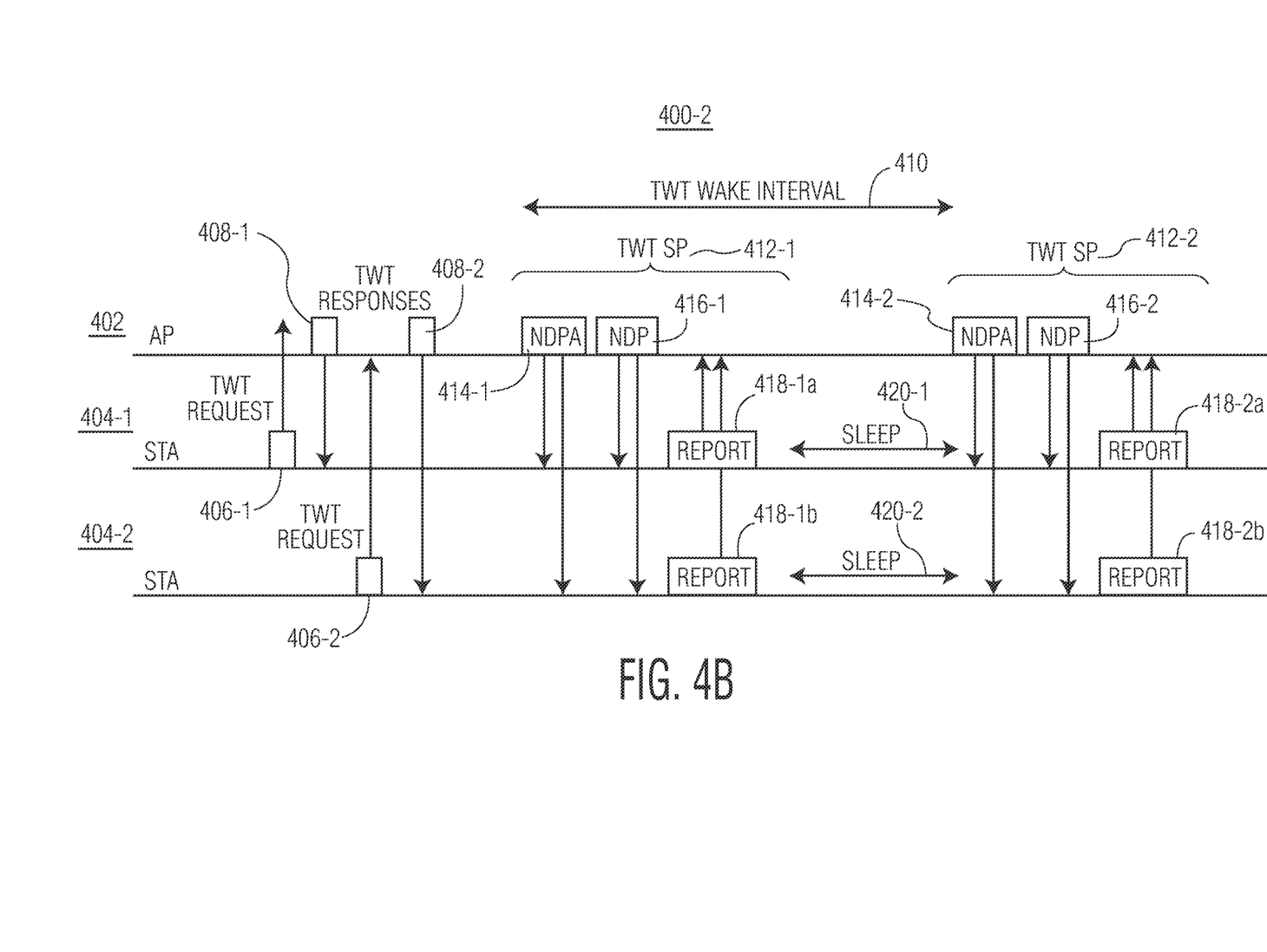
FIG. 4B illustrates another example of a WLAN sensing system performing sensing using an NDPA frame.

FIG. 4B illustrates another example of a WLAN sensing system 400-2 performing sensing using an NDPA frame. The embodiment of FIG. 4B includes AP 402, STA 404-1, the TWT request 406-1, the TWT response 408-1, the TWT wake interval 410, the first TWT SP 412-1, the second TWT SP 412-2, the first NDPA frame 414-1, the second NDPA frame 414-2, the first NDP 416-1, the second NDP 416-2, the first report frame 418-1*a*, the second report frame 418-2*a*, and the first sleep period 420-1 as described with reference to FIG. 4A.

In contrast to FIG. 4A, the sensing of the WLAN sensing system 400-2 shown in FIG. 4B includes a second STA 404-2 that transmits a second TWT request 406-2 to AP 402, and that receives a second TWT response 408-2 from AP 402. In an embodiment, exchange of the second TWT request 406-2 and the second TWT response 408-2 is part of a second negotiation between the second STA 404-2 and AP 402. The second negotiation may be used to share the agreement established by the negotiation between AP 402 and STA 404-1, or to determine a second agreement (e.g., a second sensing scheduling agreement and/or a second function scheduling agreement) to be implemented when performing the periodic sensing measurements. In addition, the second STA 404-2 receives the NDPA frames 414-1 and 414-2 and the NDPs 416-1 and 416-2 from AP 402, and in response, the second STA 404-2 transmits another first report frame 418-1*b* and another second report frame 418-2*b* to AP 402. During the TWT wake interval 410, the second STA 404-2 transitions to another first sleep period 420-2 after the first TWT SP 412-1.

With reference to FIGS. 2, 3A-3B, and 4A-4B, by negotiating parameters for performing periodic sensing measurements, non-AP STAs (e.g., non-AP STAs) can negotiate a sleep mode schedule with an AP (e.g., an AP). Negotiating the sleep mode schedule that determines wake periods and sleep periods of the non-AP STA(s) allows the non-AP STA(s) to operate in a wake state when exchanging packets (e.g., NDPs, NDPA frames, TFs, report frames, etc.) for sensing measurements, and in a doze state when not exchanging the packets. Transitioning between the wake state and the doze state allows the non-AP STA(s) to reduce energy consumption and contention levels. In addition, the non-AP STA(s) may be able to support collision-free and deterministic operations when multiple non-AP STAs are distributed over different sensing sessions (e.g., TWT sessions).

Using the negotiated parameters when performing periodic sensing measurements also allows for greater flexibility in how a transmission period can be used for exchanging sensing information. Because both uplink sensing traffic and downlink sensing traffic may be allowed, transmissions may not be limited to poll-based transmissions. In addition, non-AP STAs may not need to listen to (all) beacons, which may further reduce power consumption.

In some embodiments, a WLAN sensing system may negotiate parameters for one or more agreements (e.g., sensing scheduling agreements and/or function scheduling agreements). The WLAN sensing system may manage the agreements during communications between an AP and a non-AP STA, such that one or more agreements may be activated, suspended, reactivated (e.g., resumed), and/or switched. Examples of a WLAN sensing system managing agreements established by a negotiation are described in further detail with reference to FIGS. 5-7.

Figure 5:
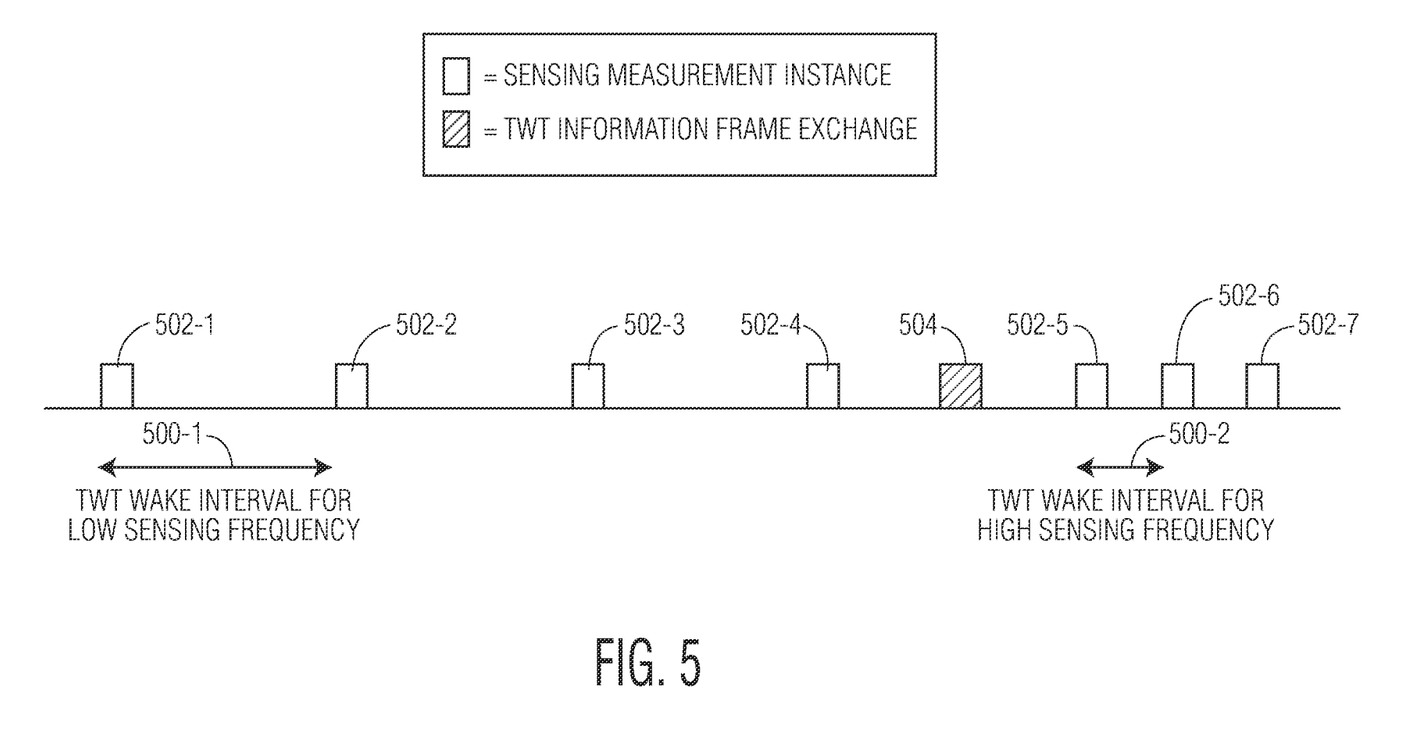
FIG. 5 illustrates an example of a WLAN sensing system switching a sensing scheduling agreement.

FIG. 5 illustrates an example of a WLAN sensing system switching a sensing scheduling agreement. The WLAN sensing system shown in FIG. 5 includes an AP (not shown) and one or more STAs (not shown) that negotiate parameters for periodic sensing scheduling agreements as described with reference to FIGS. 2, 3A-3B, and 4A-4B. In an embodiment, the AP and the STA(s) can negotiate and establish negotiated parameters for up to eight agreements (e.g., sensing scheduling agreements and/or function scheduling agreements) through a negotiation instance, such that a negotiation instance includes an exchange of one or more request messages and response messages. As an example, the AP and the STA(s) may negotiate parameters of a first sensing scheduling agreement (e.g., a TWT wake interval for low sensing frequency 500-1) and parameters of a second sensing scheduling agreement (e.g., a TWT wake interval for high sensing frequency 500-2).

After the agreements are established, the AP and the STA(s) may implement (e.g., activate) one of the agreements (and suspend the others) when performing periodic sensing measurements. For example, the AP and the STA(s) implement the negotiated parameters of the first sensing scheduling agreement and suspend the negotiated parameters of the second sensing scheduling agreement. In some embodiments, the periodic sensing measurements may include one or more sensing measurement instances, such that a sensing measurement instance includes a TWT wake interval, a TWT SP, exchange of an NDP, an NDPA frame, a TF, and/or a report frame, and a sleep period.

In the embodiment of FIG. 5, the WLAN sensing system implements the negotiated parameters of the TWT wake interval for low sensing frequency 500-1. The negotiated parameters of the TWT wake interval for low sensing frequency 500-1 are implemented for a first sensing measurement instance 502-1, a second sensing measurement instance 502-2, a third sensing measurement instance 502-3, and a fourth sensing measurement instance 502-4.

After the fourth sensing measurement instance 502-4, the AP and the STA(s) perform a TWT information frame exchange 504 in which TWT-related frames are exchanged. The TWT information frame exchange 504 may involve suspending the negotiated parameters of the TWT wake interval for low sensing frequency 500-1 and/or switching to the negotiated parameters of the TWT wake interval for high sensing frequency 500-2. In some embodiment, the negotiated parameters of the TWT wake interval for low sensing frequency 500-1 are suspended and/or switched to the negotiated parameters of the TWT wake interval for high sensing frequency 500-2 after a predetermined period (e.g., a predetermined number of sensing measurement instances, a predetermined amount of time, etc.).

After the negotiated parameters of the TWT wake interval for low sensing frequency 500-1 are suspended and/or switched, the negotiated parameters of the TWT wake interval for high sensing frequency 500-2 are implemented. The negotiated parameters of the TWT wake interval for high sensing frequency 500-2 are implemented for a fifth sensing measurement instance 502-5, a sixth sensing measurement instance 502-6, a seventh sensing measurement instance 502-7, and/or subsequent sensing measurement instances (not shown). Although not shown, negotiated parameters of an agreement may be suspended, resumed, reactivated, and/or switched more than once.

By suspending negotiated parameters of a first sensing scheduling agreement (e.g., the negotiated parameters of the TWT wake interval for low sensing frequency 500-1) and switching to negotiated parameters of a second sensing scheduling agreement (e.g., the negotiated parameters of the TWT wake interval for high sensing frequency 500-2), WLAN sensing systems can quickly adapt to environmental changes. When more frequent and/or more accurate sensing measurements are needed, the WLAN sensing system can switch from a low frequency sensing scheduling agreement to a high frequency sensing measurement agreement. Alternatively, when less frequent sensing measurements are needed, the WLAN sensing system can switch from a high frequency sensing scheduling agreement to a low frequency sensing measurement agreement which may save power consumption and bandwidth.

Figure 6:
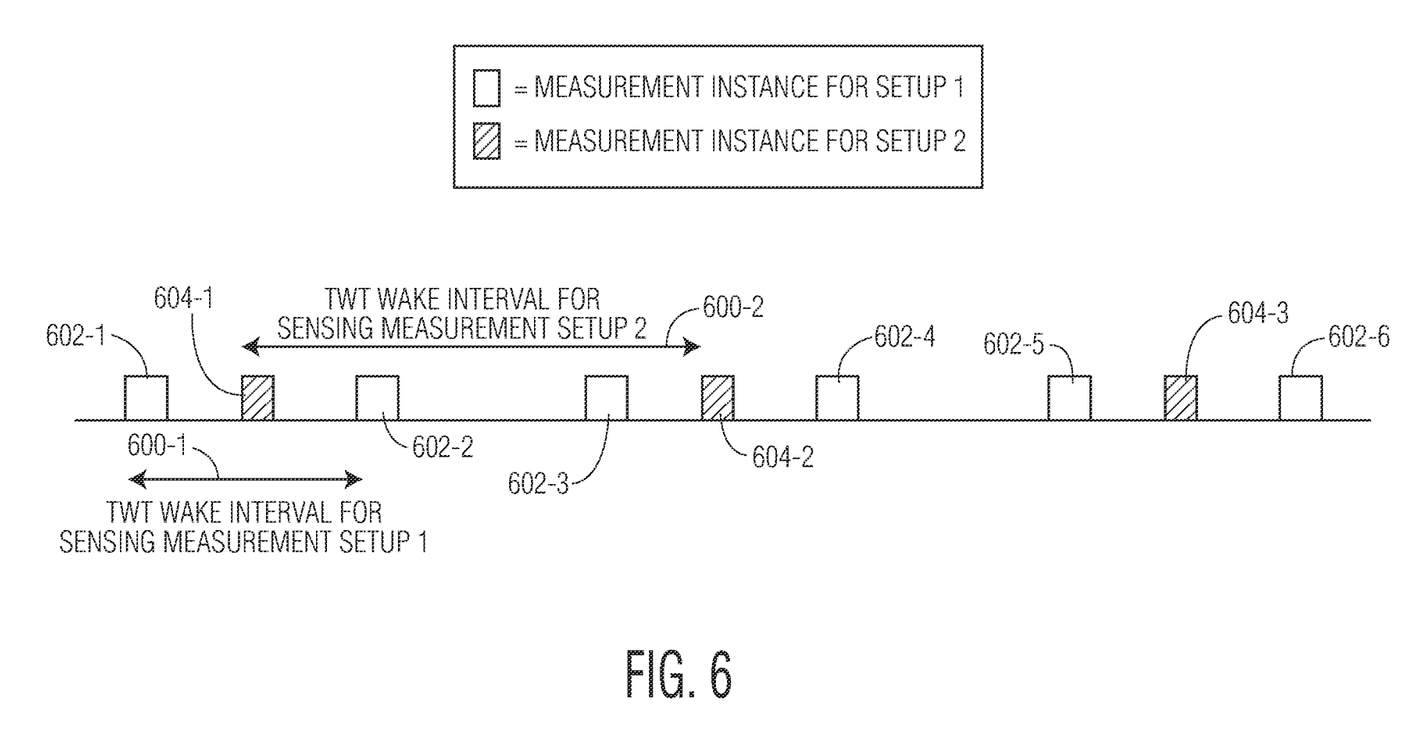
FIG. 6 illustrates an example of a WLAN sensing system using two sensing scheduling agreements.

FIG. 6 illustrates an example of a WLAN sensing system using two sensing scheduling agreements. The WLAN sensing system shown in FIG. 6 includes an AP (not shown) and one or more STAs (not shown) that negotiate parameters for periodic sensing scheduling agreements as described with reference to FIG. 5.

In contrast to FIG. 5, the embodiment of FIG. 6 includes a first sensing scheduling agreement and a second sensing scheduling agreement, implemented as a TWT wake interval for sensing measurement setup 1 600-1 and a TWT wake interval for sensing measurement setup 2 600-2, respectively, that are implemented concurrently. As described herein, "concurrently" may be described as occurring simultaneously (e.g., at the same time), as occurring within a predetermined time, or as occurring in an alternating, overlapping manner.

Negotiated parameters of the TWT wake interval for sensing measurement setup 1 600-1 may have a high measurement frequency. In an embodiment, the TWT wake interval for sensing measurement setup 1 600-1 with the high measurement frequency is a non-TB measurement that is initiated by the STA. Negotiated parameters of the TWT wake interval for sensing measurement setup 2 600-2 may have a low measurement frequency. In an embodiment, the TWT wake interval for sensing measurement setup 2 600-2 with the low measurement frequency includes the AP performing sensing measurements via a proxy procedure (for a client) and receiving NDPs from the STA(s). In some embodiments, the negotiated parameters of the TWT wake intervals for sensing measurement setups 600-1 and 600-2 have different TWT SPs and/or different TWT wake intervals.

When implemented, the TWT wake interval for sensing measurement setup 1 600-1 alternates and overlaps with the TWT wake interval for sensing measurement setup 2 600-2. The TWT wake interval for sensing measurement setup 1 600-1 is implemented for a first high frequency measurement instance 602-1, a second high frequency measurement instance 602-2, a third high frequency measurement instance 602-3, a fourth high frequency measurement instance 602-4, a fifth high frequency measurement instance 602-5, and a sixth high frequency measurement instance 602-6. The TWT wake interval for sensing measurement setup 2 600-2 is implemented for a first low frequency measurement instance 604-1, a second low frequency measurement instance 604-2, and a third low frequency measurement instance 604-3.

Figure 7:
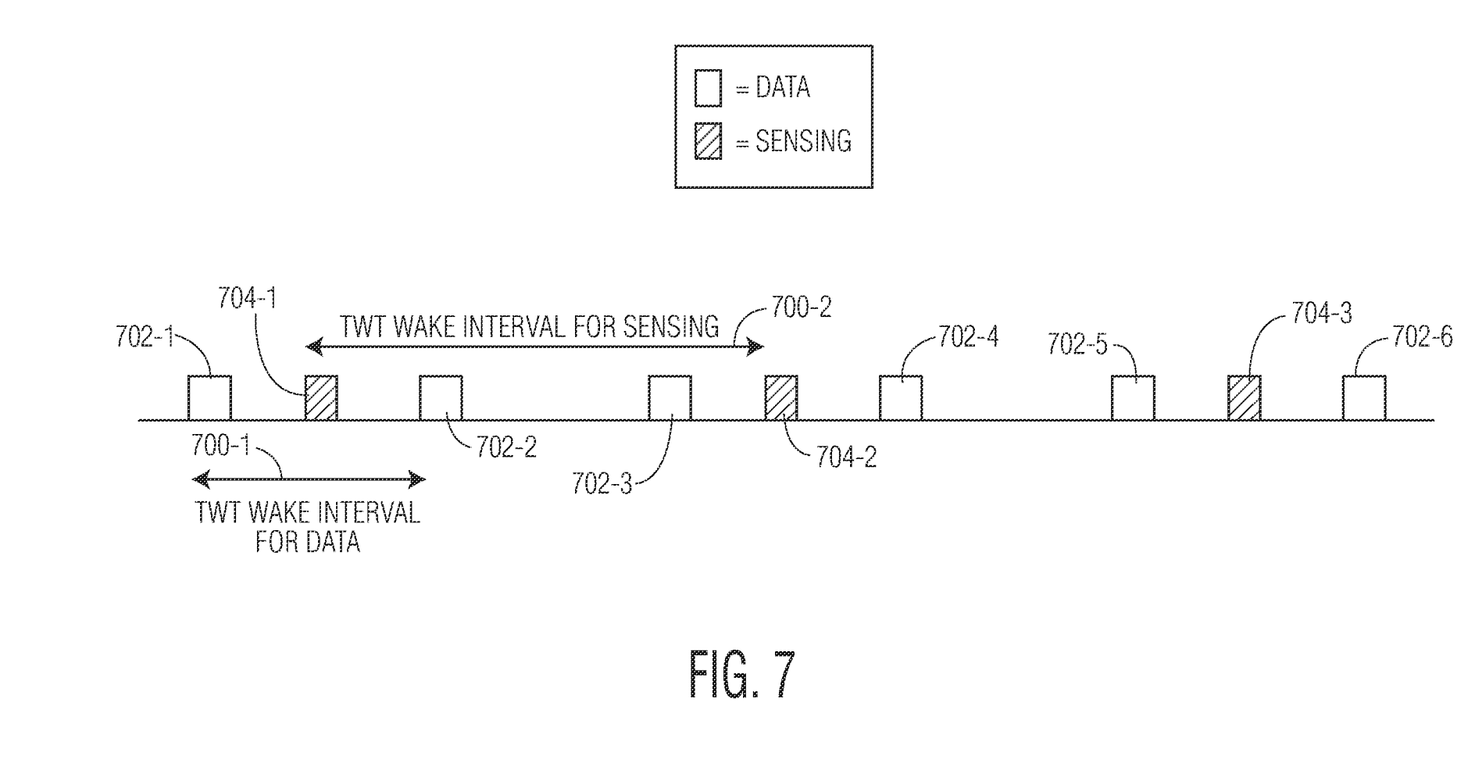
FIG. 7 illustrates an example of a WLAN sensing system using two function scheduling agreements.

FIG. 7 illustrates an example of a WLAN sensing system using two function scheduling agreements. The WLAN sensing system shown in FIG. 7 includes an AP (not shown) and one or more STAs (not shown) that negotiate parameters for agreements as described with reference to FIG. 6.

In contrast to FIG. 6, the embodiment of FIG. 7 includes a first function scheduling agreement and a second function scheduling agreement, implemented as TWT wake interval for data 700-1 and a TWT wake interval for sensing 700-2, respectively. As an example, the TWT wake interval for data 700-1 represents a data communication scheduling agreement and the TWT wake interval for sensing 700-2 represents a sensing scheduling agreement. The TWT wake interval for data 700-1 and the TWT wake interval for sensing 700-2 may each have corresponding negotiated parameters. In some embodiments, the negotiated parameters of the TWT wake intervals 700-1 and 700-2 have different TWT SPs and/or different TWT wake intervals.

Examples of other function scheduling agreements may include, but are not limited to, a ranging scheduling agreement and a positioning scheduling agreement.

In an embodiment, the TWT wake interval for data 700-1 and the TWT wake interval for sensing 700-2 are implemented concurrently. The TWT wake interval for data 700-1 is implemented for a first data instance 702-1, a second data instance 702-2, a third data instance 702-3, a fourth data instance 702-4, a fifth data instance 702-5, and a sixth data instance 702-6. The TWT wake interval for sensing 700-2 is implemented for a first sensing instance 704-1, a second sensing instance 704-2, and a third sensing instance 704-3.

Figure 8:
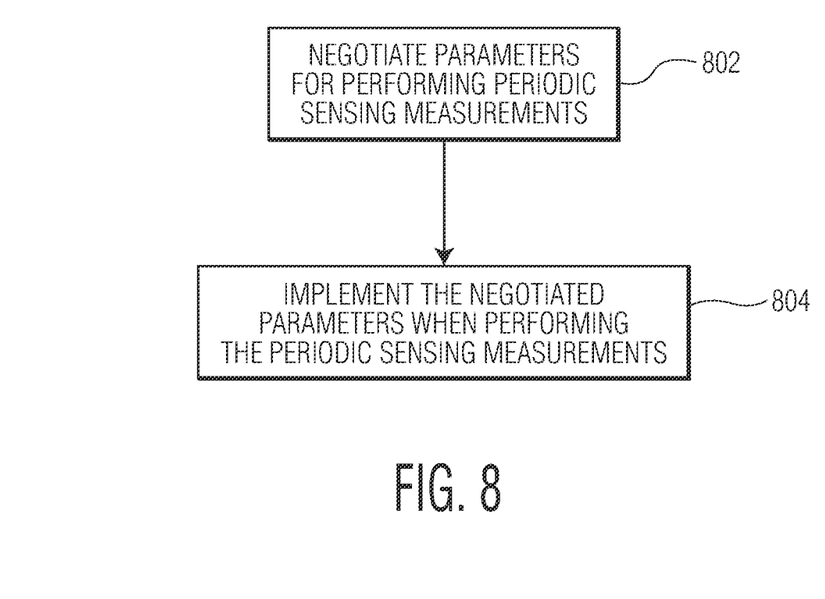
FIG. 8 illustrates a flow diagram of a technique for periodic WLAN sensing in accordance with an embodiment of the invention.

FIG. 8 illustrates a flow diagram of a technique for periodic WLAN sensing in accordance with an embodiment of the invention. At block 802, a device that includes a wireless network interface device negotiates parameters for performing periodic sensing measurements. At block 804, the device implements the negotiated parameters when performing the periodic sensing measurements.

In some embodiments, the technique for periodic WLAN sensing includes negotiating parameters for performing periodic sensing measurements, and implementing the negotiated parameters when performing the periodic sensing measurements.

In some embodiments, the technique for periodic WLAN sensing may be implemented by a system. For example, a system includes an AP configured to perform periodic sensing measurements, and a non-AP STA configured to negotiate parameters for performing periodic sensing measurements, and implement the negotiated parameters when performing the periodic sensing measurements.

Figure 9:
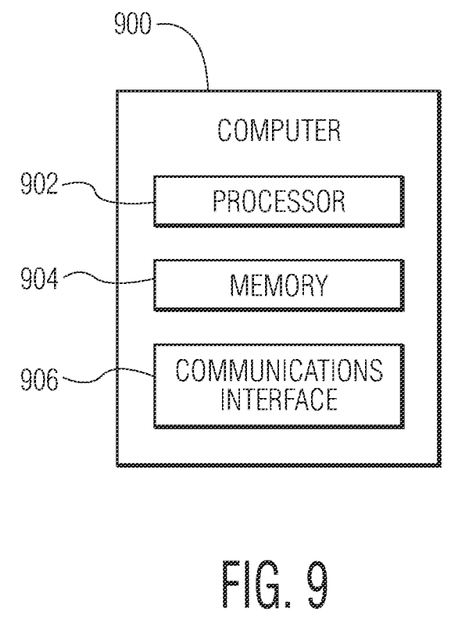
FIG. 9 depicts an example of a computer that can implement the technique for periodic WLAN sensing as described with reference to FIG. 8.

In an embodiment, the above-described functionality is performed at least in part by a computer or computers, which executes computer readable instructions. FIG. 9 depicts an example of a computer 900 that can implement the technique for periodic WLAN sensing as described herein with reference to FIG. 8. As shown, the computer 900 includes a processor 902, a memory 904, and a communications interface 906. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 900 may represent a sensing device (e.g., an AP, a non-AP STA, a sensing scheduler, a sensing schedule requestor, a sensing transmitter, a sensing receiver, a sensing initiator, a sensing responder, etc.). In such an example, the sensing device includes a wireless network interface device implemented on one or more ICs. As an example, the wireless network interface device may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless local area network (WLAN) device, comprising:
   an access point (AP) or a non-access point (non-AP) station (STA) configured to:
      negotiate Target Wake Time (TWT) service period (SP) and/or Availability Window (AW) parameters for performing periodic environmental sensing measurements based on characteristics of WLAN compliant wireless signals transmitted between the WLAN device and another WLAN device; and
      implement the negotiated parameters when performing the periodic environmental sensing measurements;
      negotiate parameters of a first function scheduling agreement and parameters of a second function scheduling agreement; and
      implement the negotiated parameters of the first function scheduling agreement and the negotiated parameters of the second function scheduling agreement concurrently.

2. The device of claim 1,
   wherein the negotiated parameters include a sleep mode schedule of the device.

3. The device of claim 1,
   wherein the negotiated parameters include a sleep mode schedule of the device, and wherein the sleep mode schedule is a duration of a wake interval during which the device is in a sleep mode.

4. The device of claim 1,
   wherein the negotiated parameters include a sleep mode schedule of the device, and wherein implementation of the sleep mode schedule includes the device transitioning from a wake state to a doze state during a wake interval.

5. The device of claim 4, wherein the device is in:
the wake state during at least one of the Target Wake Time (TWT) service period (SP) and the availability window (AW) of the wake interval; and
the doze state after at least one of the TWT SP and the AW.

6. The device of claim 1, wherein negotiation of the parameters includes:
transmitting proposed parameters via a request message; and
receiving a response message, wherein the response message indicates the negotiated parameters accepted from the proposed parameters.

7. The device of claim 1, wherein the negotiated parameters are scheduling parameters that determine:
a wake interval;
at least one of the TWT SP and the AW; and
a sleep mode schedule of the device.

8. The device of claim 1,
wherein implementation of the negotiated parameters includes the device transmitting a Null Data Packet (NDP) during at least one of the TWT SP and the AW.

9. The device of claim 8,
wherein the device transmits the NDP in response to receiving a Trigger frame (TF) during at least one of the TWT SP and the AW.

10. The device of claim 1, wherein implementation of the negotiated parameters includes the device:
transmitting an NDP during at least one of the TWT SP and the AW; and
transitioning from a wake state during at least one of the TWT SP and the AW to a doze state after at least one of the TWT SP and the AW.

11. The device of claim 1, wherein the device:
negotiates parameters of a first sensing scheduling agreement and parameters of a second sensing scheduling agreement;
implements the negotiated parameters of the first sensing scheduling agreement; and
switches from the negotiated parameters of the first sensing scheduling agreement to the negotiated parameters of the second scheduling agreement after a predetermined period.

12. The device of claim 1, wherein the device:
negotiates parameters of a first sensing scheduling agreement and parameters of a second sensing scheduling agreement;
implements the negotiated parameters of the first sensing scheduling agreement;
suspends the negotiated parameters of the first sensing scheduling agreement after a predetermined period; and
implements the negotiated parameters of the second sensing scheduling agreement after suspending the negotiated parameters of the first sensing scheduling agreement.

13. The device of claim 1, wherein the device:
negotiates parameters of a first sensing scheduling agreement and parameters of a second sensing scheduling agreement; and
implements the negotiated parameters of the first sensing scheduling agreement and the negotiated parameters of the second sensing scheduling agreement concurrently.

14. The device of claim 1, wherein:
the first function scheduling agreement is a sensing scheduling agreement; and
the second function scheduling agreement is at least one of a data communication scheduling agreement, a ranging scheduling agreement, and a positioning scheduling agreement.

15. The device of claim 1, wherein the WLAN device is at least one of the AP or the non-AP STA that serves as at least one of a sensing responder, a sensing transmitter, or a sensing receiver.

16. The device of claim 1:
wherein the periodic environmental sensing measurements are based on physical layer (PHY) characteristics of the WLAN compliant wireless signals transmitted between the WLAN device and the another WLAN device.

17. The device of claim 1:
wherein a protocol for performing the periodic environmental sensing measurements are defined by IEEE802.11bf.

18. The device of claim 1:
wherein wireless communication channel state information from the WLAN compliant wireless signals transmitted between the WLAN device and the another WLAN device enable the environmental sensing measurements to be obtained.

19. A method for periodic wireless local area network (WLAN) sensing, the method comprising:
negotiating Target Wake Time (TWT) service period (SP) and/or Availability Window (AW) parameters for performing periodic environmental sensing measurements based on characteristics of WLAN compliant wireless signals transmitted between a first WLAN device and a second WLAN device; and
implementing the negotiated parameters when performing the periodic environmental sensing measurements;
wherein the first and second WLAN devices include at least one of an access point (AP) and a non-access point (non-AP) station (STA);
negotiating parameters of a first sensing scheduling agreement and parameters of a second sensing scheduling agreement; and
implementing the negotiated parameters of the first sensing scheduling agreement and the negotiated parameters of the second sensing scheduling agreement concurrently.

20. A wireless local area network (WLAN) device, comprising:
an access point (AP) or a non-access point (non-AP) station (STA) configured to:
negotiate Target Wake Time (TWT) service period (SP) and/or Availability Window (AW) parameters for performing periodic environmental sensing measurements based on characteristics of WLAN compliant wireless signals transmitted between the WLAN device and another WLAN device; and
implement the negotiated parameters when performing the periodic environmental sensing measurements;
negotiate parameters of a first sensing scheduling agreement and parameters of a second sensing scheduling agreement;
implement the negotiated parameters of the first sensing scheduling agreement; and
switches from the negotiated parameters of the first sensing scheduling agreement to the negotiated parameters of the second scheduling agreement after a predetermined period.

* * * * *